E. M. BAUKNECHT.
VEHICLE SEAT LOCK.
APPLICATION FILED SEPT. 15, 1909.
978,104.
Patented Dec. 6, 1910.
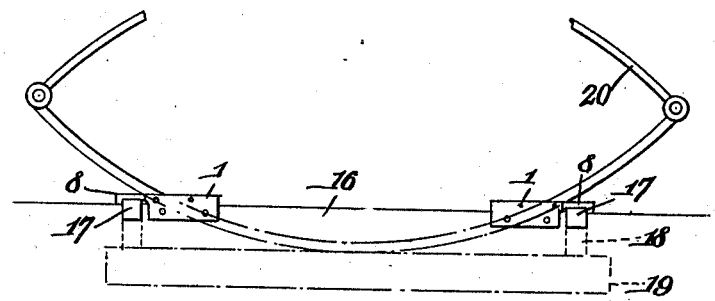
Fig. 1.
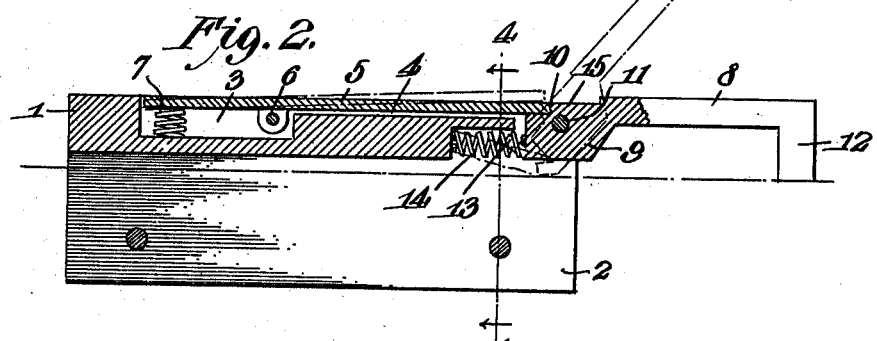
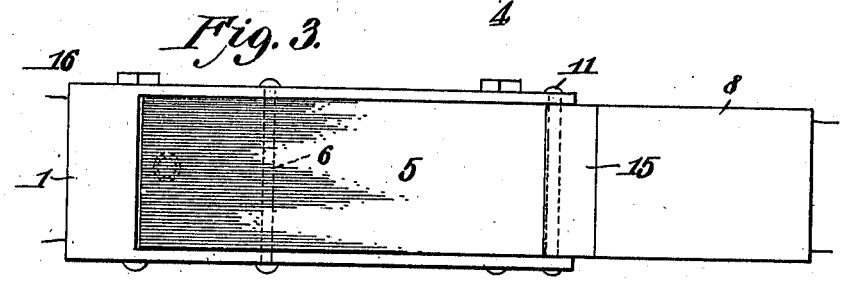
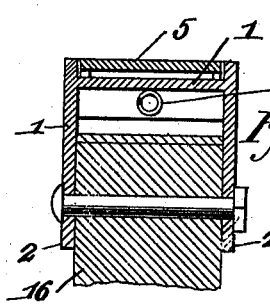
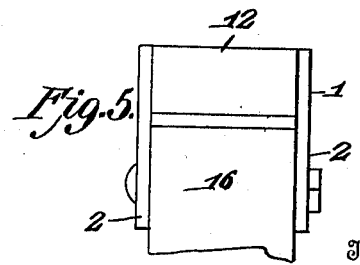
Witnesses
Inventor
Edward M. Bauknecht,
By Victor J. Evans.
Attorney

UNITED STATES PATENT OFFICE.

EDWARD M. BAUKNECHT, OF MARTINS FERRY, OHIO.

VEHICLE-SEAT LOCK.

978,104. Specification of Letters Patent. Patented Dec. 6, 1910.

Application filed September 15, 1909. Serial No. 517,853.

*To all whom it may concern:*

Be it known that I, EDWARD M. BAUKNECHT, a citizen of the United States, residing at Martins Ferry, in the county of Belmont and State of Ohio, have invented new and useful Improvements in Vehicle-Seat Locks, of which the following is a specification.

This invention relates to vehicle seat locks, and an object of the invention is to provide simple, effective and novel means that can be conveniently applied to the sideboards of a vehicle box or body and effectively engaged with supporting members of the spring to hold the seat against becoming casually disengaged from the vehicle body.

The above mentioned and other objects are attained by the construction, combinations and arrangements of parts, as disclosed on the drawing, set forth in this specification, and particularly pointed one in the appended claims.

In the drawing, forming a portion of this specification and in which like numerals of reference indicate similar parts in the several views:—Figure 1 is a detail end elevation of a portion of a vehicle seat spring showing the same in its applied position upon a portion of a wagon body. Fig. 2 is a detail sectional elevation of my improved lock. Fig. 3 is a top plan view of the lock. Fig. 4 is a transverse section taken on the line 4—4 of Fig. 2. Fig. 5 is a detail end view of a portion of one of the sideboards showing my improved lock applied thereto.

My improved lock embodies a member 1 which is formed with a pair of spaced depending flanges 2 which are apertured for the reception of retaining bolts or equivalent fastening devices that may be conveniently applied to the sideboards of a vehicle. The member 1 is provided with a cavity 3 which communicates with a recess 4 in which is mounted a latch member 5. The latch member extends longitudinally of the member 1 and is provided with a pivotal connection 6 in the cavity 3. An expansion spring 7 is arranged in the cavity 3 and is adapted to exert its tension against one end of the latch member, thus holding the latch member normally seated in the recess 4. A keeper 8 is carried by the member 1 and as illustrated the said keeper is provided with a head 9 which is preferably of rectangular form. This head is formed with a recess 10 in which the free end of the latch member is adapted to be seated so that the keeper can be effectively held against pivotal movement. As illustrated, the member 1 is provided with a transversely extending bolt 11 which extends through an aperture formed in the head 9. This construction offers pivotal connection for the keeper. The outer end of the keeper is formed into a hook 12 for a purpose to be hereinafter described. The head 9 is provided with a lug 13 with which one end of an extensile spring 14 is engaged, the other end of the said spring being secured in any well known manner to the member 1. The purpose of the spring 14 is to exert its tension against the lug 13 to hold the keeper in a plane approximately with the member 1. The upper surface of the head 9 is notched or recessed to form a shoulder stop 15 against which is adapted to be engaged the free end of the latch member.

From the construction just described it will be seen that the portion of the latch member with which is engaged the expansion spring 7 and which portion may be termed the tail of the latch member is movable vertically in the cavity 3 and this portion may be depressed manually against the tension of the spring so that the free end of the latch member can be moved out of the recess 10 and engaged with the shoulder 15. The spring 13 also serves to hold the keeper in an elevated position as shown in Fig. 2 of the drawing when the latch member 5 is moved to the dotted line position. In practice, a pair of keepers is applied to each sideboard of the vehicle body. A portion of a vehicle is illustrated in the drawing, and as shown, the sideboard 16 has detachably engaged therewith the hooked ends 17 of hangers 18. These hangers support the usual longitudinally extending cleat 19 upon which one leaf of an elliptical seat-supporting spring 20 is mounted and secured. The hooked ends 17 of the hangers 18 are arranged in juxtaposition with the keepers 12 and the said keepers are arranged for engagement with the said hooked ends of the hangers to hold them against longitudinal movement upon the sideboard and to also hold the hangers against becoming entirely displaced from the sideboards incident to the vibratory movements of the wagon body when the wagon is traveling over rough roads or obstructions. The hangers 18 are of the detachable type so that the seat of which they are a part may be bodily disengaged from the vehicle. When it is desired to disengage the seat from the vehicle the tail portions of the latch members are depressed as hereinbefore stated so that their free extremities can be moved out of engagement with the recessed portions of the keeper heads 9. When the keepers have been thus released they may be elevated and moved entirely out of engagement with the hooked ends 17 of the hangers 18.

A seat lock as herein shown and described is simple in construction, may be manufactured at a relatively low cost, will be found most efficient and it may be applied to vehicles employing the usual longitudinally extending spaced sideboards.

I claim:—

1. In a device of the class described, a sideboard, a cleat, a hanger carried by the cleat and adapted to be engaged with the said sideboard, a lock mounted upon the sideboard, a spring-pressed latch member, a pivoted keeper, spring means exerting its tension against the said latch member, said latch member being formed for engagement with the said keeper to hold it against pivotal movement, and means upon the keeper to engage the latch member to limit the pivotal movement of the keeper in one direction.

2. A seat lock for vehicles comprising a member adapted to be engaged with the vehicle and having a recess formed therein, a pivoted keeper supported by the member, a latch member engaging the keeper to hold it normally against pivotal movement, a spring located in the said recess and exerting its tension against the said latch member, and spring means exerting its tension against the keeper to move it on its pivot into released position when the latch member is released from the keeper.

In testimony whereof I affix my signature in presence of two witnesses.

EDWARD M. BAUKNECHT.

Witnesses:
 WALTER W. LARKIN,
 C. G. BAUKNECHT.